US008136214B2

(12) United States Patent
Hessbrüggen

(10) Patent No.: US 8,136,214 B2
(45) Date of Patent: Mar. 20, 2012

(54) MACHINING APPARATUS

(75) Inventor: Norbert Hessbrüggen, Salach (DE)

(73) Assignee: EMAG Holding GmbH, Salach (DE)

(*) Notice: Subject to any disclaimer, the term of this patent is extended or adjusted under 35 U.S.C. 154(b) by 727 days.

(21) Appl. No.: 12/199,930

(22) Filed: Aug. 28, 2008

(65) Prior Publication Data

US 2009/0106962 A1    Apr. 30, 2009

(30) Foreign Application Priority Data

Oct. 29, 2007  (DE) .......................... 10 2007 051 904

(51) Int. Cl.
*B23P 23/00* (2006.01)
*B23B 7/08* (2006.01)
*B23B 7/16* (2006.01)
*B23B 3/20* (2006.01)
*B23Q 7/00* (2006.01)

(52) U.S. Cl. ............... 29/27 C; 29/36; 29/563; 82/122; 82/121; 82/124; 82/129

(58) Field of Classification Search ............ 29/27 R, 29/27 C, 28, 563, 36; 82/122, 120, 121, 82/124, 129; 409/165, 167, 158, 159, 161, 409/172, 173; 451/242, 244, 246
See application file for complete search history.

(56) References Cited

U.S. PATENT DOCUMENTS

| 4,597,155 A * | 7/1986 | Garnett et al. ............. 29/564 |
| 5,781,983 A * | 7/1998 | Gruner ....................... 29/563 |
| 2006/0048614 A1 * | 3/2006 | Lange et al. ................ 82/129 |
| 2010/0233939 A1 * | 9/2010 | Schmitz ....................... 451/49 |
| 2010/0291837 A1 * | 11/2010 | Hessbrueggen ............... 451/5 |

FOREIGN PATENT DOCUMENTS

| DE | 3203891 | 11/1982 |
| DE | 4136916 | 11/1991 |
| DE | 19900294 A1 * | 7/2000 |
| DE | 102004038005 | 8/2004 |
| DE | 102004012385 B3 * | 9/2005 |
| DE | 102004022649 | 12/2005 |
| EP | 1574273 | 9/2005 |

OTHER PUBLICATIONS

Machine Translation of DE 19900294, which DE '294 was published in Jul. 2000.*
Machine Translation of DE 102004012385, which DE '385 was published in Sep. 2005.*

* cited by examiner

*Primary Examiner* — Erica E Cadugan
(74) *Attorney, Agent, or Firm* — Andrew Wilford

(57) ABSTRACT

A machining apparatus (1) for machining rotation-symmetrical workpieces (10), comprising a machine frame (4), which has a vertical front face (11), further comprising at least one vertical workpiece spindle (2) that is arranged on the front face (11) and can be driven rotatorily, comprising at least two tool holders (3 and 3a), which are arranged on the front face (11) displaceably horizontally and vertically by means of compound slides (5 and 5a), further comprising a conveyor (9) for workpieces (10), and a loading and unloading device (13), wherein the workpieces (10) can be transported by the conveyor (9) in a direction parallel to the front face (11).

18 Claims, 9 Drawing Sheets

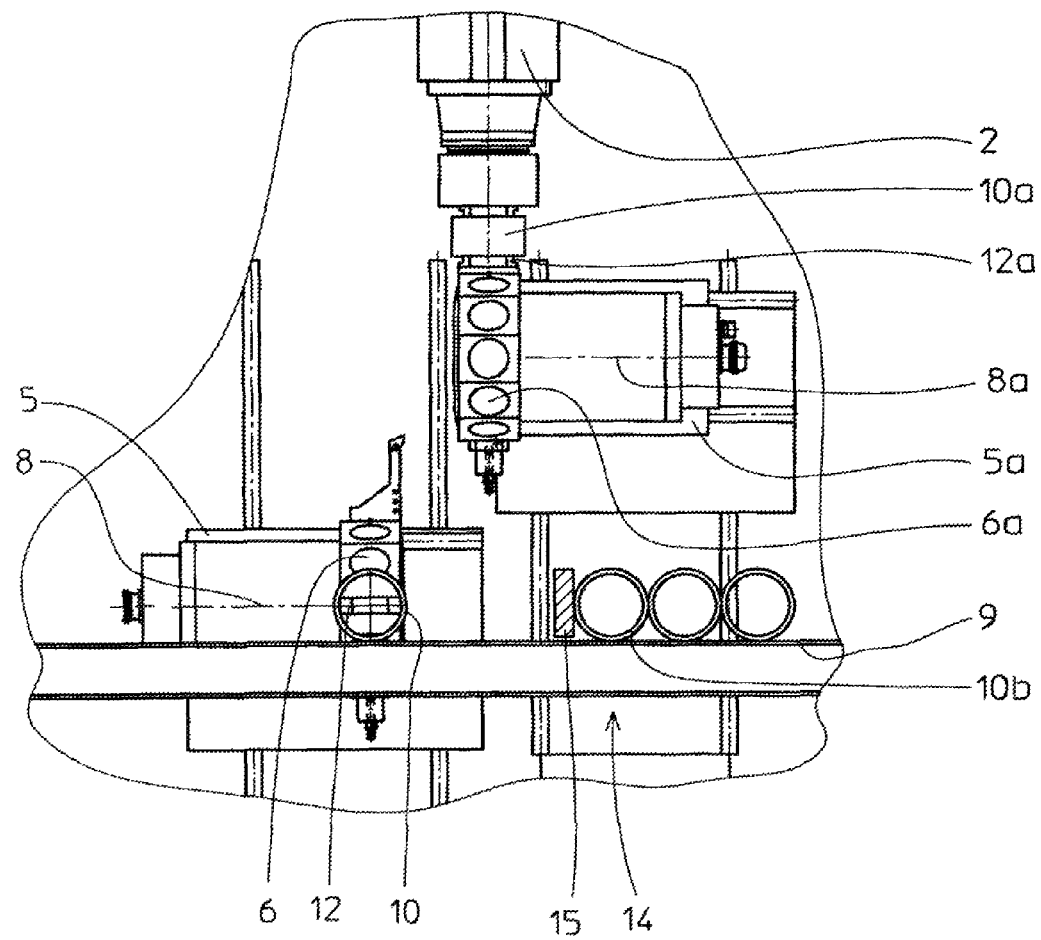

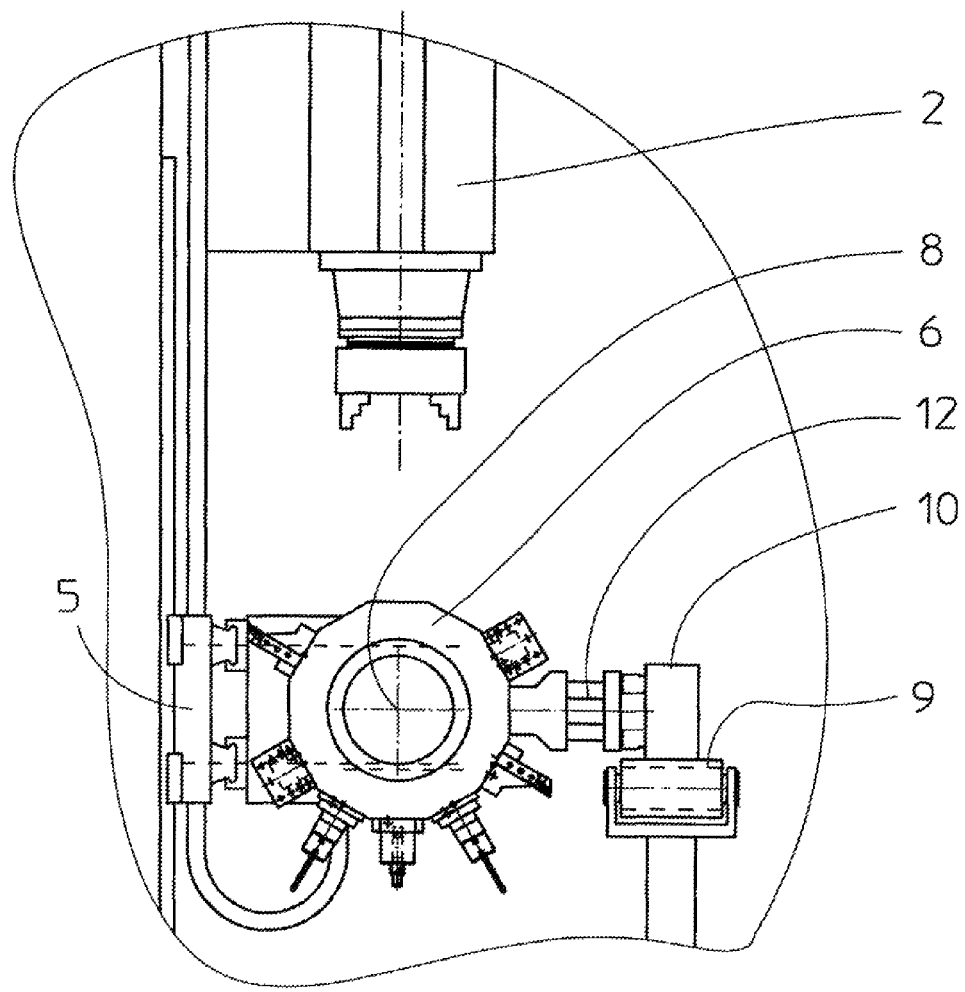

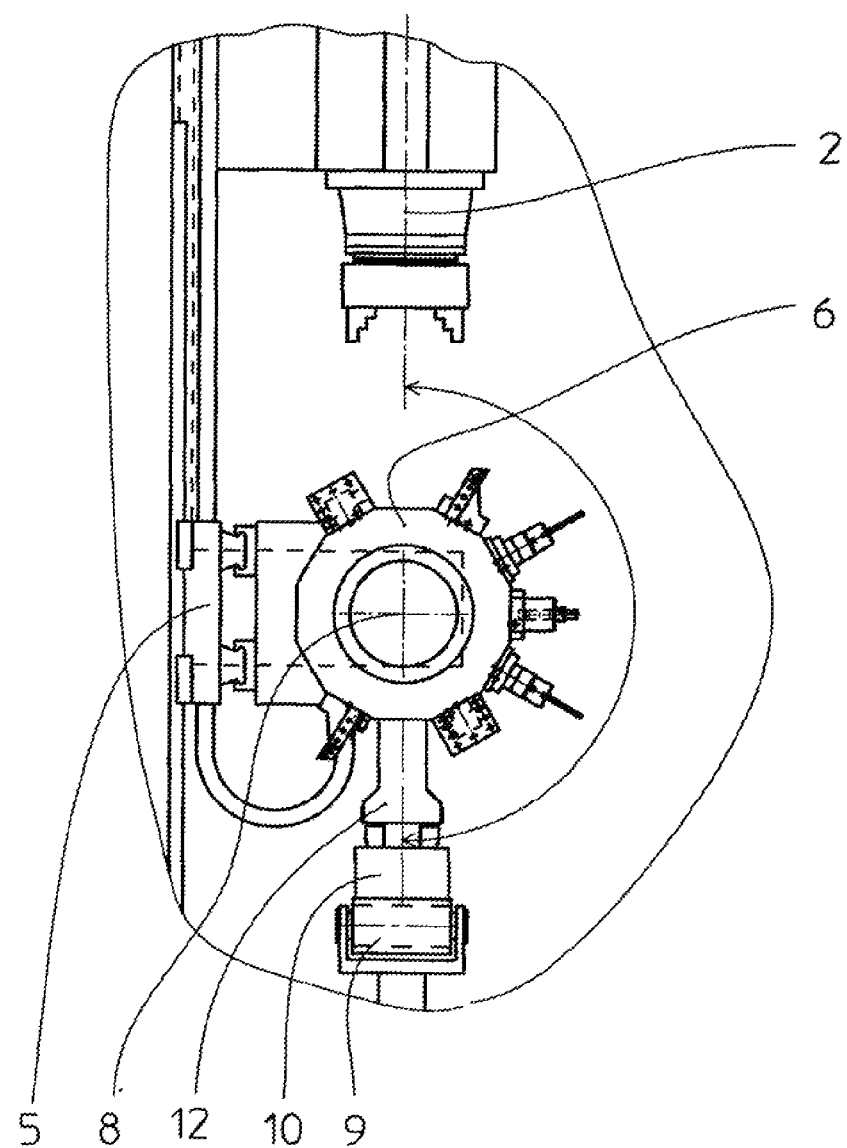

MACHINING APPARATUS

FIELD OF THE INVENTION

The invention relates to a machining apparatus for machining rotation-symmetrical workpieces, comprising a machine frame having a vertical front wall surface, a vertical workpiece spindle on the front wall surface, at least two tool holders on the front wall surface displaceably horizontally and vertically by compound slides, a transport device for workpieces, and a loading and unloading device.

BACKGROUND OF THE INVENTION

A machining apparatus of this type is known from EP 1 574 273. In this machine, the workpiece spindle is carried on the machine frame for displacement on two axes (X, Z). It operates based on the pick-up method, which is to say it seizes the workpieces from a transport device, feeds them to the machining operation, and subsequently sets them down again. The two turrets can each be displaced in axial direction X or Z. The workpieces are fed in on the one machine side and removed on the opposite side.

OBJECT OF THE INVENTION

It is the object of the present invention to create a compact, space-saving machining apparatus. It is also the aim of the invention to configure a machining apparatus such that workpiece transport can be carried out in an optimized and cost-effective manner.

SUMMARY OF THE INVENTION

This object is attained by a machining apparatus in which the workpieces can be transported by the transport device in a direction parallel to the front wall surface.

An advantageous aspect of the invention is the feeding of the workpieces from the operator side in the case of a machining apparatus having a vertical working spindle. Since lateral conveyor belts are eliminated, a space-saving machine design becomes possible. In addition, the machining apparatus can also be set up in a particularly compact manner. The short distances during loading and unloading can be viewed as a further advantage of this solution. As a result, nonproductive times during which no machining of workpieces occurs can be significantly reduced.

BRIEF DESCRIPTION OF THE DRAWING

Additional characteristics and advantages of the is invention will be apparent from the following description based on the illustrated embodiments. Therein:

FIGS. 2a and 2b are detailed views according to FIG. 1;

FIGS. 4a and 4b are detailed illustrations according to FIG. 3;

FIGS. 6 and 7 are advantageous embodiments in detail views like FIG. 3.

DETAILED DESCRIPTION

Figure 1:
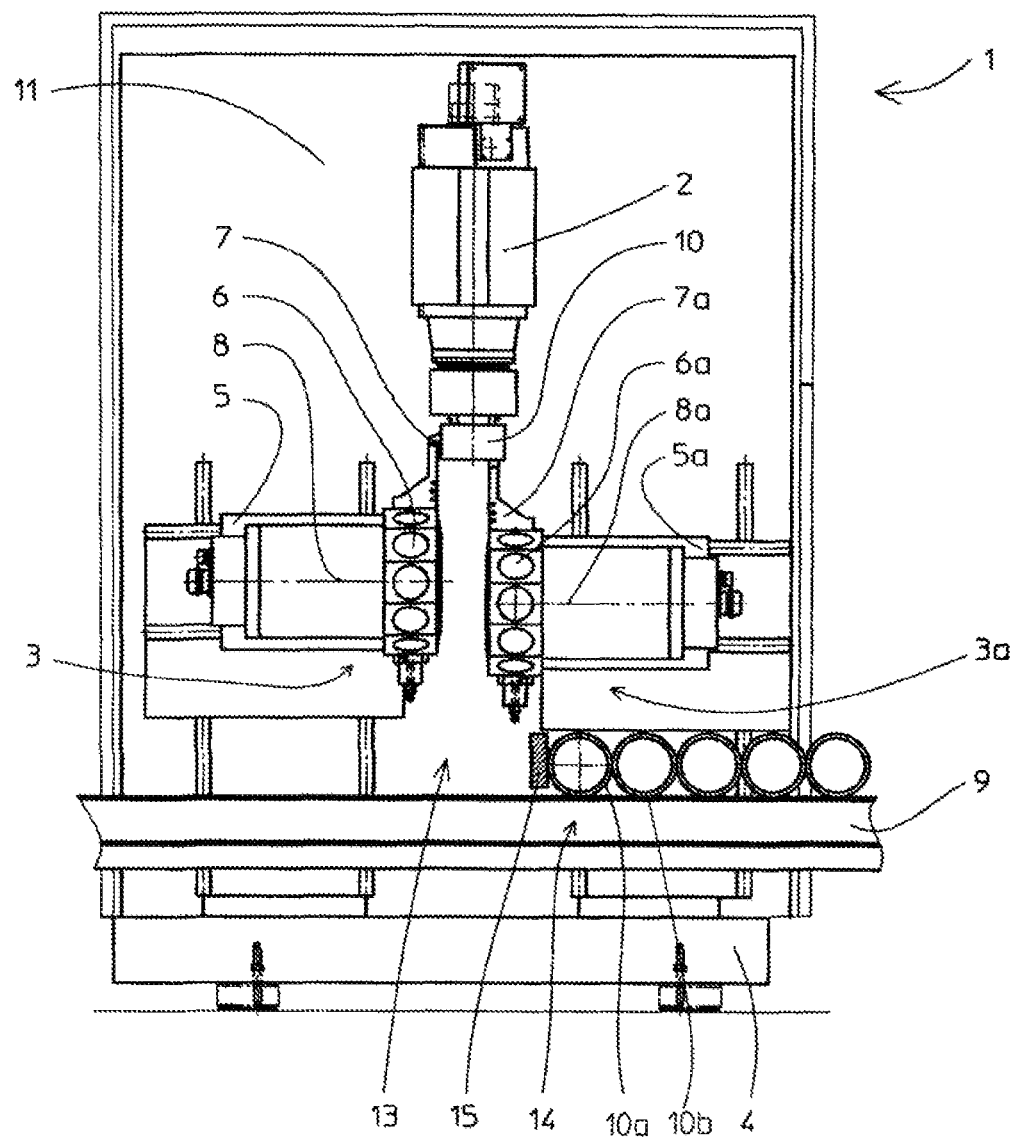
FIG. 1 is a front view of the machining apparatus according to the invention.
Figure 2A:
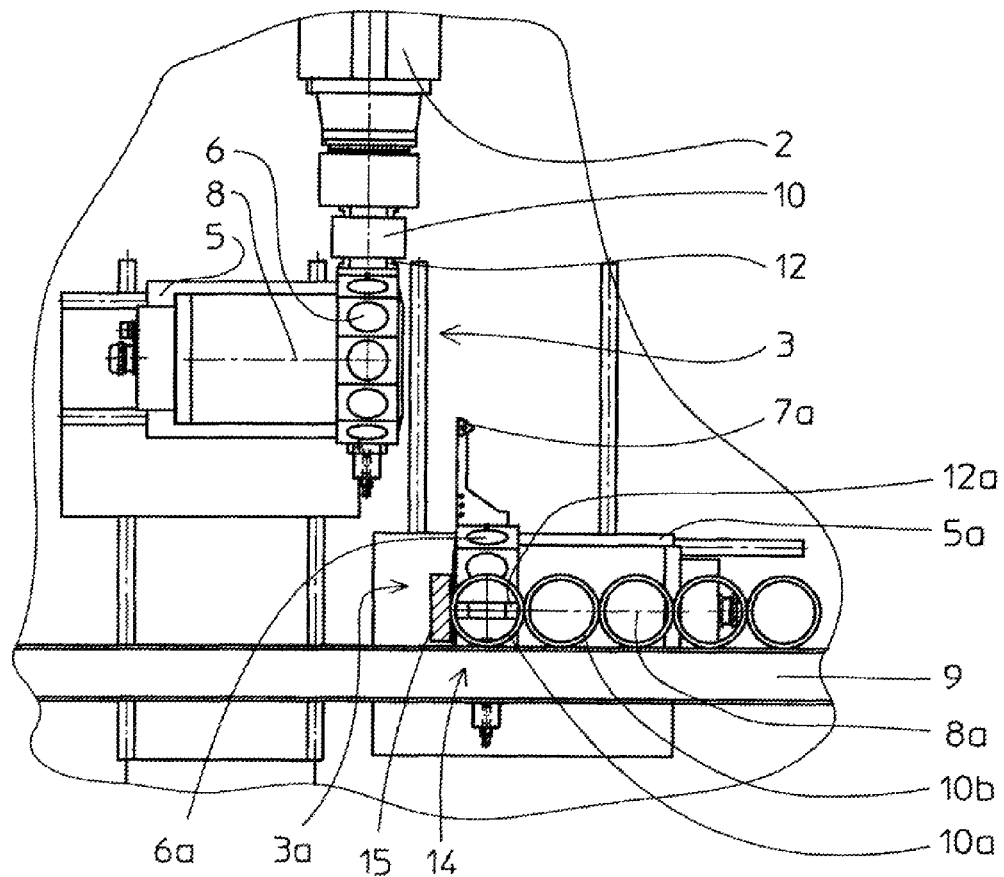

FIG. 1 shows a machining apparatus 1 for machining rotation-symmetrical workpieces 10, wherein for better clarity parts that are not essential for the invention, particularly details of the drive mechanism, the controller and the housing, have been omitted. The machining apparatus 1 comprises a vertical workpiece spindle 2, which is arranged on the machine frame 4 in a stationary manner, and two tool holders 3, 3a. The two tool holders 3, 3a are configured as turrets and displaceable on respective compound slides 5, 5a in the horizontal direction (X) and vertical direction (Z) on the machine frame 4. The turret disks 6, 6a with the tools 7, 7a are rotatably supported about respective horizontal pivot axes 8, 8a. The transport device 9 delivers unmachined workpieces 10a and 10b to the workpiece feeding position 14 and removes the machined workpieces 10. In an advantageous embodiment, the transport device 9 is configured as a continuously revolving endless conveyor belt, which continuously pushes the unmachined workpieces 10a and 10b against the stop 15 in the workpiece receiving position 14. Based on the detailed illustrations in FIGS. 2a and 2b, the loading process is clarified. The start of the loading process is shown in FIG. 2a. There, the gripper device 12 of the tool holder 3 seizes the finished workpiece 10 in the workpiece spindle 12. Due to a vertical movement of the compound slide 5, and simultaneous pivoting of the turret disk 6 about the pivot axis 8, the workpiece 10 is placed down onto the transport device 9. The compound slide 5 moves additionally in the horizontal direction to allow the workpiece spindle 2 to be loaded at the same time. For loading purposes, the gripper device 12a receives an unmachined workpiece 10a in the workpiece feeding station 14. The movements of the compound slide 5a, and the pivoting movement of the turret disk 6a, are the same as the movements during unloading, however in the opposite direction. FIG. 2b shows the completed loading process: The finished workpiece 10 has been set down onto the transport device 9, and the unmachined workpiece blank 10a has been inserted into the workpiece spindle 2. After removing the workpiece 10a from the workpiece feeding position 14, the following unmachined workpiece 10b has been transported from the transport device 9 to the stop 15.

Figure 3:
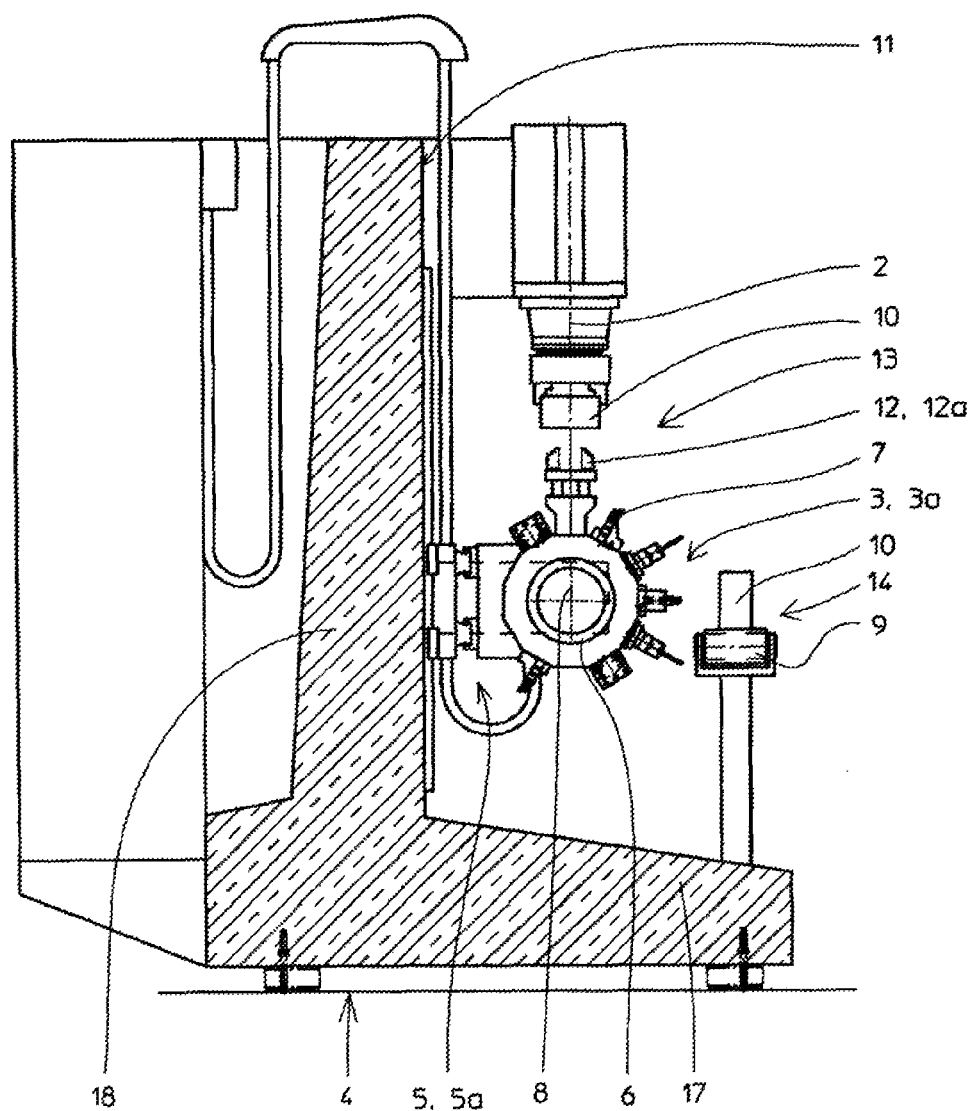
FIG. 3 is a side view
Figure 4A:
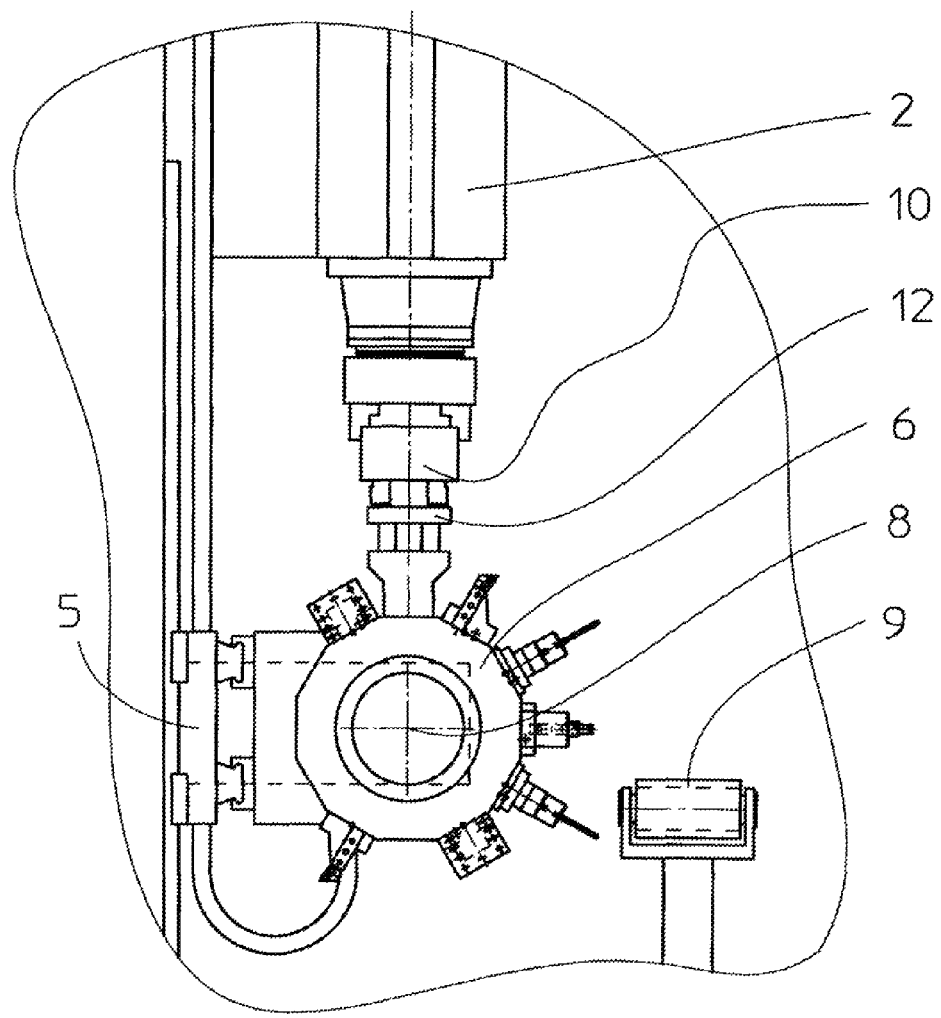
Figure 5A:
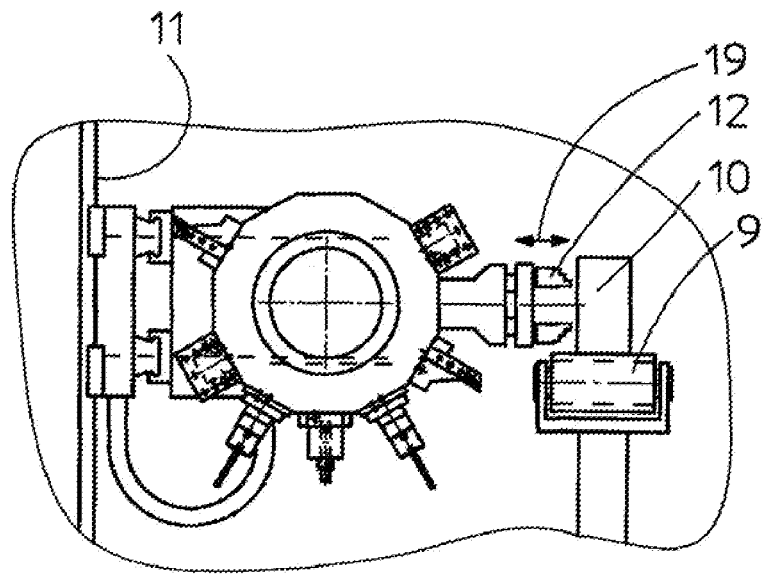
FIGS. 5a and 5b show the gripping operation.
Figure 5B:
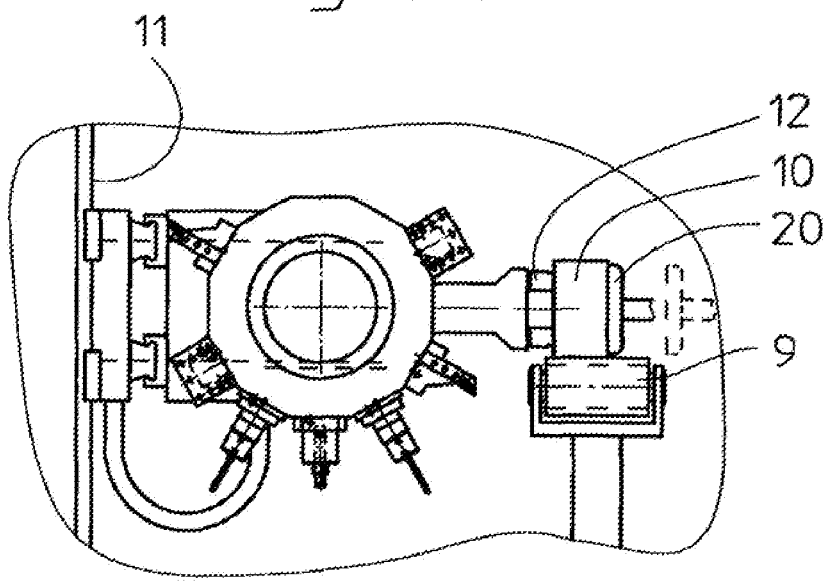

FIG. 3 shows the machining apparatus 1 in a side view. The machine frame 4 comprises a wider lower frame part 17 and a narrower upper frame part 18 projecting upward therefrom, the upper part having a vertical front wall surface 11. The workpiece spindle 2 is attached to the vertical wall surface 11 in a stationary manner, and the tool holders 3, 3a can be displaced in the horizontal and vertical directions by means of the compound slides 5, 5a. In an advantageous embodiment, the loading and unloading device 13 is integrated into the tool holders 3, 3a. For handling the workpieces 10, the tool holders 3, 3a are provided with gripper devices 12, 12a. The transport device 9 is arranged parallel to the front wall surface 11. Compared to the state of the art, the distances for loading and unloading are particularly short because the workpiece feeding position 14 can be arranged very close to the workpiece spindle 2. As a result, nonproductive times, during which no machining of workpieces occurs, can be significantly reduced. The short transport distances during loading and unloading are clearly apparent in the side views according to FIGS. 4a and 4b. The gripper device 12 seizes the workpiece 10, and due to a vertical movement of the compound slide 5, and simultaneous pivoting of the turret disk 6 about the pivot axis 8 by a pivot angle of 90°, the workpiece 10 is placed down onto the transport device 9. In order to maneuver the gripper device 12 into and out of the workpiece 10 located on the transport device 9, both parts must be moved relative to each other in one direction orthogonal to the vertical wall 11. For this purpose, according to FIG. 5a a telescoping gripper device 12 is provided, which can perform the corresponding lifting motion in the direction of the double arrow 19 if necessary. Alternatively, in the embodiment according to FIG. 5b a tappet 20 is provided, which pushes the workpiece 10 onto the gripper device 12.

In the embodiment according to FIG. 6, the horizontal lifting movement between the workpiece 10 and the gripper device 12 can be eliminated as the transport device 9 is arranged beneath the tool holder 3. In the process, the workpiece 10 is set down onto the transport device 9 following a pivoting movement of the turret disk 6 about the pivot axis 8 by a pivot angle β of 180°. For maneuvering the workpiece 10 in and out, the compound slide 5 is moved into the vertical direction.

Figure 7:
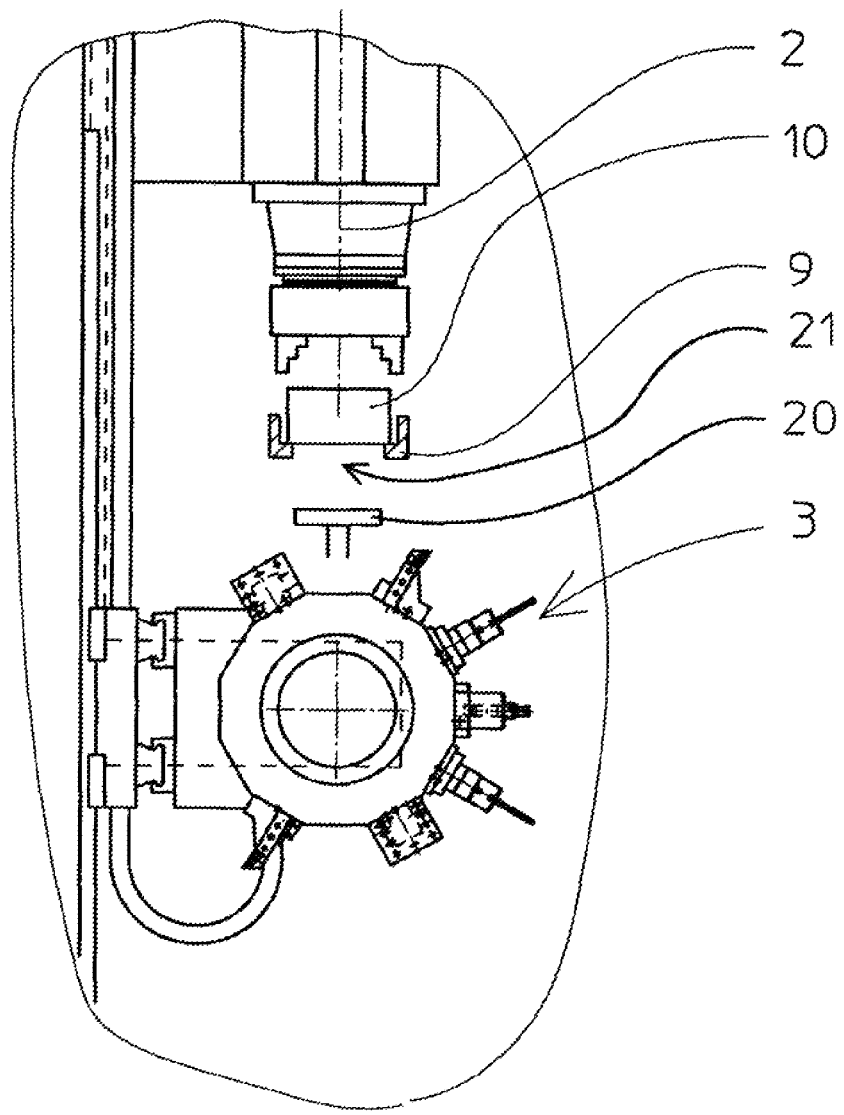

In a further advantageous embodiment according to FIG. 7, the transport device 9 can be moved into a position between the workpiece spindle 2 and the tool holder 3. The transport device 9 is open on the bottom. Through the opening 21, the workpieces 10 are inserted into the workpiece spindle 2 by the tappet 20. The embodiment has the advantage that the movable transport device 9 requires even less space.

The invention claimed is:

1. A machining apparatus for machining rotation-symmetrical workpieces, the apparatus comprising:
   a machine frame having a vertical front face,
   at least one rotatable vertical workpiece spindle on the front face,
   at least two tool holders,
   respective compound slides mounted on the front face and supporting the tool holders for movement along vertical and horizontal axes,
   a conveyor in front of the front face for transporting unmachined workpieces in a direction parallel to the front face to a workpiece intake station adjacent the spindle and for displacing machined workpieces away from the frame, and
   a loading and unloading device.

2. The machining apparatus according to claim 1 wherein the workpiece spindle is arranged on the machine frame in a stationary manner and the conveyor and the loading and unloading device are arranged beneath the workpiece spindle.

3. The machining apparatus according to claim 2 wherein the loading and unloading device is in front of the vertical front face, viewed from an operator side.

4. The machining apparatus according to claim 1 wherein the tool holders are configured as turrets that are supported pivotally about horizontal pivot axes.

5. The machining apparatus according to claim 4 wherein the turrets each have a grab for handling the workpieces.

6. The machining apparatus according to claim 5 wherein the turrets can be displaced in active regions of both the workpiece intake station and the workpiece spindle.

7. The machining apparatus according to claim 6 wherein the workpieces can be transported from the workpiece intake station to the workpiece spindle by means of the grabs by displacing the compound slides and pivoting the turrets about the horizontal pivot axes.

8. The machining apparatus according to claim 7 wherein the workpieces are transported horizontally on the conveyor and reach a vertical orientation after being received by the grabs as a result of pivoting the turrets by 90°.

9. The machining apparatus according to claim 5 wherein for receiving the workpiece the grabs and the workpieces can be moved relative to each other in a direction orthogonal to the front face.

10. The machining apparatus according to claim 1, wherein the conveyor is continuously operating, the apparatus further comprising
    a stop for positioning the workpieces in the workpiece intake station.

11. The machining apparatus according to claim 1 wherein the conveyor transports the workpieces into a position directly beneath the workpiece spindle, the apparatus further comprising
    a lifting device for inserting the workpieces into the workpiece spindle.

12. An apparatus for machining rotation-symmetrical workpieces, the apparatus comprising:
    a machine frame having a vertical front face;
    a vertical spindle mounted on the frame in front of the front face and rotatable about a vertical spindle axis;
    two tool holders;
    respective compound slides on the front face carrying the tool holders and each displaceable horizontally and vertically; and
    conveyor means in front of the front face for displacing workpiece blanks parallel to the face to an intake position adjacent the spindle and for displacing machined workpieces away from the frame also parallel to the face.

13. The machining apparatus defined in claim 12 wherein the spindle is only rotatable about the spindle axis and is fixed against other movement on the frame.

14. The machining apparatus defined in claim 12 wherein the conveyor is a continuous belt having an upper stretch extending horizontally past the frame underneath the spindle.

15. The machining apparatus defined in claim 14, further comprising
    a stop above the upper stretch and defining the intake position.

16. The machining apparatus defined in claim 12 wherein the conveyor is directly underneath the spindle aligned with the spindle axis and is openable so the workpieces can pass vertically through the conveyor.

17. The machining apparatus defined in claim 12 wherein each holder is a turret rotatable about a respective horizontal turret axis on the respective slide.

18. The machining apparatus defined in claim 17 wherein each turret carries offset from the respective turret axis a respective grab.

* * * * *